Oct. 30, 1962 W. DELLITH 3,061,349
STRUCTURAL SEAM FASTENER
Filed Dec. 9, 1960 2 Sheets-Sheet 1

INVENTOR
WERNER DELLITH
BY John P. Chandler
HIS ATTORNEY

Oct. 30, 1962  W. DELLITH  3,061,349
STRUCTURAL SEAM FASTENER
Filed Dec. 9, 1960  2 Sheets-Sheet 2

INVENTOR
WERNER DELLITH

BY *John P. Chandler*

HIS ATTORNEY

United States Patent Office 3,061,349
Patented Oct. 30, 1962

3,061,349
STRUCTURAL SEAM FASTENER
Werner Dellith, Ringwood, N.J., assignor to
Camloc Fastener Corporation
Filed Dec. 9, 1960, Ser. No. 74,950
9 Claims. (Cl. 292—304)

This invention relates to securing means for structural doors, primarily in aircraft, and relates more particularly to a structural seam fastener for a pair of doors which generally open downwardly from an aircraft and which forms a continuous spine or longeron providing a key or interlock between the outer meeting edges of the doors.

The seam fastener of the present invention finds an important use on aircraft of very high speed for securing engine access doors which are usually formed in pairs and for doors in the wing and in the fuselage whose contours usually have compound curvatures and which bear structural loads so that it is necesary to have continuous fastening means over every inch of their meeting edges. Quick acting latches at spaced points have been found wholly unsuited for this purpose. More particularly, the seam fasteners of the present invention has effective use in doors of cellular or honeycomb construction which have a high strength-low weight ratio. These doors are subjected to a very high bending moment and accordingly have both an inner and an outer sheet metal skin.

An important object of the present invention is to provide a continuous fastener for a pair of doors of this type which forms, in effect, a continuous, separable weld for both inner and outer skins.

Another object of the invention is to provide a continuous seam fastener for a pair of doors which provides, in effect, a spine or structural joint which, when the parts are locked up, form a structural continuation from one door to the other and from the two sections of the inner skin to each other and to the two sections of the outer skin. The greater stresses are concentrated on the two sections of the outer skin but the two sections of the inner skin are subjected to very considerable stresses and strains as well, and after the doors are closed access to the inside to effectively secure these latter sections is, of course, impossible.

In doors of this character a center frame or other center stop is wholly undesirable. Accordingly, another object of the invention is to provide a structural seam fastener of the character described which locks one door to the other but which permits one door alone to be opened, and if both doors are opened there is no center frame to reduce the effective size of the opening. The meeting edges of the two doors are fitted with a frame of special contour including a number of convex and concave surfaces which are received in the spinal element or connecting member, formed with complementary curved surfaces and having two hinge plates, also formed with special curved and flat surfaces, all of which surfaces interlock with surfaces of the door frames and the geometric interlock is such that either door may be opened independently of the other and once hinge plates have been released no further unfastening is required to open the other door.

Figure 1:
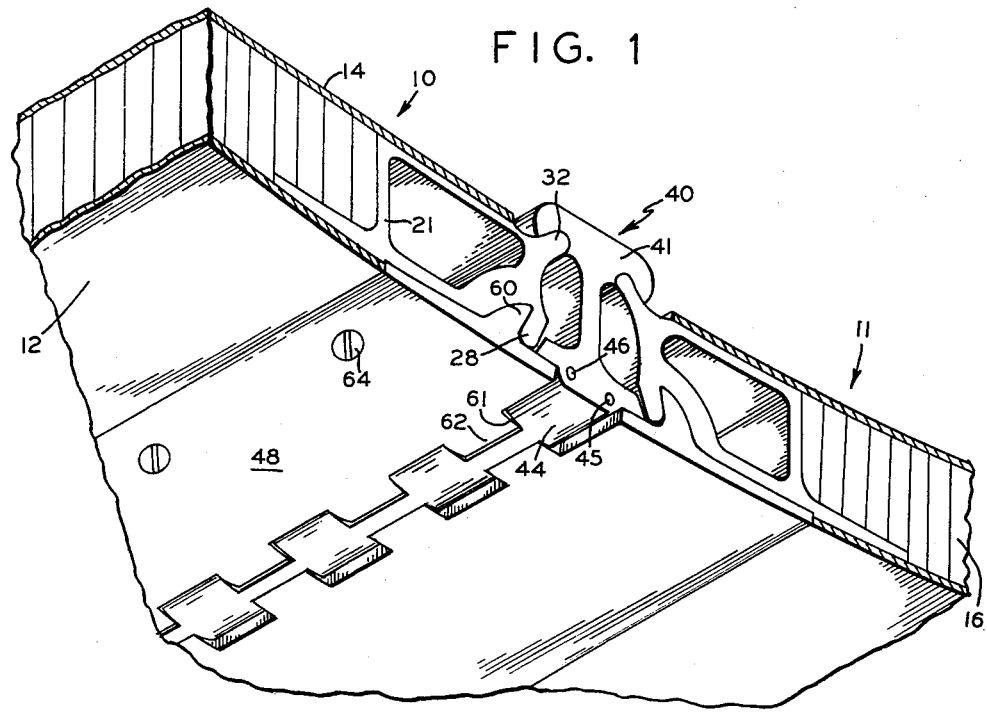
FIG. 1 is a broken perspective view showing two doors of cellular construction fitted with the seam fastener of the present invention with the parts in locked condition.

The seam fastener structure of the present invention is shown as carried by two doors 10 and 11 of similar construction and which may be hinged along one edge to a structure. The hinge element is not shown but it is preferably of a type to allow easy detachability of the door. This door is formed with an outer skin 12 and an inner skin 14 with a cellular structure 16 between the skins.

Each seam fastener includes a frame 18 extending along the outer margin of each door and because of its multiple curved contours it is preferably a metal extrusion. It has a flange 19 on one side which is disposed on the outside of the craft to which outer skin 12 is secured. For convenience of description "inner" and "outer" as used herein and in the appended claims are deemed to refer to the respective opposed faces of the door. Contours will also be described as sloping toward or away from an imaginary median line located between the meeting edges of the doors.

The frame is formed with a connecting wall 21 defining the inner side of a longitudinal opening 22. An outer wall 24 has has a special contour including a concavely curved section 26 with a structural flange 28 extending towards the outside of the craft and having opposed faces 29 and 30. This flange slopes away from the median line. Continuing beyond face 30, there is a concave section 31 terminating in a second structural flange 32 sloping outwardly or towards said median line. This flange has opposed faces 34 and 36, the latter terminating in a concavely curved section 38 which merges into inner wall 39 to which inner skin 14 is secured.

Figure 4:
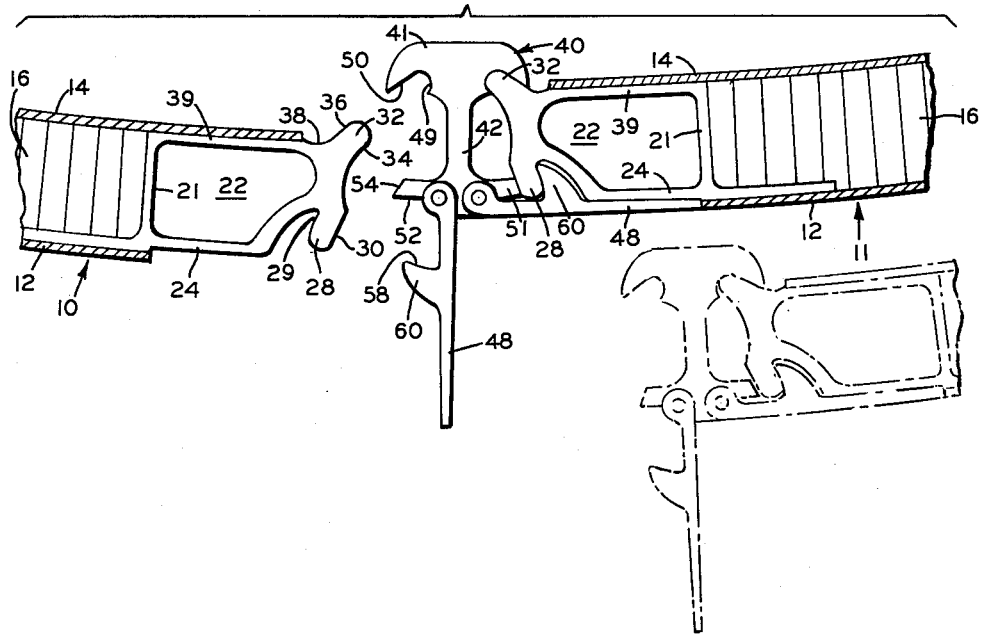
FIG. 4 shows the position of the parts as one door is partially opened.
Figure 5:
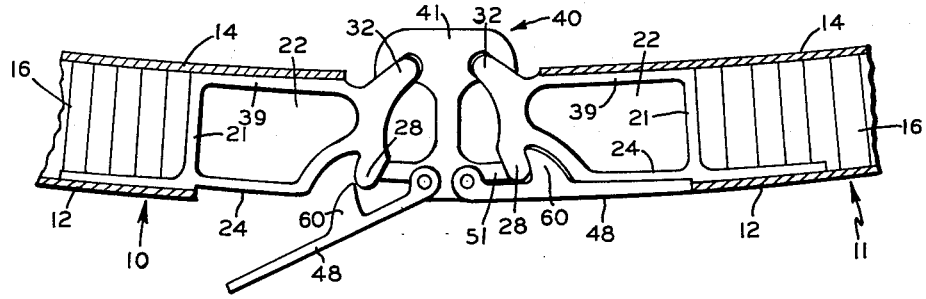
FIG. 5 shows the position of the parts as the final lock-up is about to be achieved.

The spinal element or I-shaped seam bar 40, is also of extruded construction because of its several curved surfaces and has an inner wall or head 41 and an intermediate web or wall 42 whose outer end 44 has aligned openings 45 which receives pintles 46 which support hinge plates 48 in pivoted relation. The head 41 has a continuous recess or groove on each side thereof forming opposed walls 49 and 50 which are engaged by surfaces 34 and 36 of flange 32 in snug fit relation. It will be noted in FIG. 4 that the contours of the meeting faces are such that when the open door approaches the seam bar during the closing operation the flange 32 moves neatly into the recess defined by opposed walls 49 and 50. The outer end 44 of the seam bar has a flange 51 on each side thereof and a curved flange 60 is formed on the inner surface of hinged locking plate 48, said flange having a concavely curved surface 58 on the side adjacent the median line which engages surface 29 of flange 28 of the frame.

The locking plates 48 are formed on their inner edge with spaced knuckles 62 having pintle openings which become aligned with openings 45 in the outer wall and which receive pintles 46. The outer end 44 of the seam bar also has spaced cut-away sections 61 to receive knuckles 62.

It will be noted that surfaces 29 and 58 are arcs of a circle whose common center is the axis of pintle 46. These interlock with each other to form a structural tensile joint.

Flange 51 on the seam bar has an outer edge 52 which is engaged by the inner surface of locking plate 48 and this flange also has a diagonal edge 54 adjoining edge 52 which slopes toward the median line and which engages outer surface 30 of flange 28. It will be apparent from the foregoing that any forces tending to separate the meeting edges of the doors are resisted by the parts whose meeting faces 58 and 29 are in tension. Conversely, any forces tending to jamb the doors together are resisted by the parts having surfaces 30 and 54 which are in compression.

Figure 2:
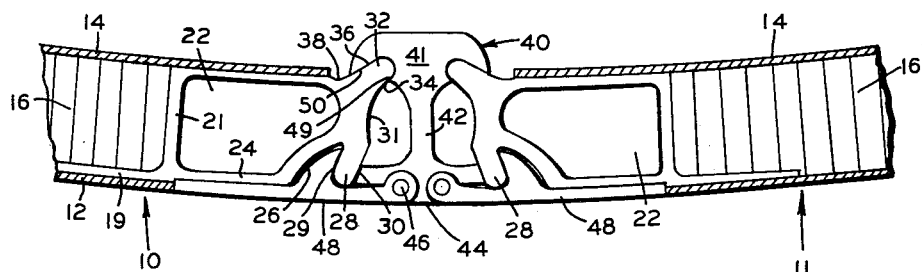
FIG. 2 is an end elevation thereof.
Figure 3:
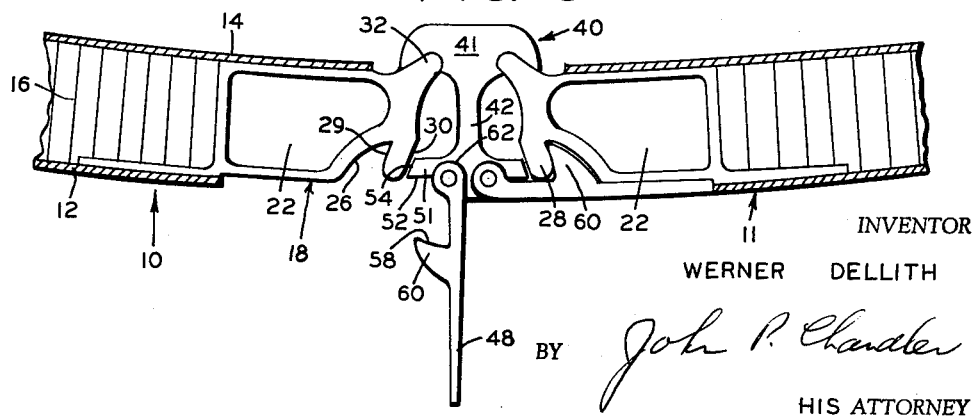
FIG. 3 is a similar view with one of the hinge plates in unfastened position.

Hinged locking plates 48 are secured in the closed position of FIGS. 1 and 2 by spaced screw type or rotary stud fasteners 64. These fasteners can be ordinary machine screws but they are preferably quick acting stressed panel fasteners of the type shown in Patent No. 2,881,499.

This effective interlock of all the critical surfaces of the meeting edges assures a secure fastening over all sections of said edges and assures against mechanical failure. It will be apparent from FIG. 4 and particularly from the broken line portion at the right that the hinge axis of the doors is located at a point considerably above the meeting edges which accounts for the angle of surfaces 34—36 of flange 32 and surfaces 50—49 of the seam bar. If the doors were more nearly flat these surfaces would be more nearly parallel to the median line between the doors, but the other surfaces could remain as shown.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. A quickly releasable structural seam fastener for providing a continuous interlock over the entire lengths of the meeting edges of a pair of outwardly opening doors provided with inner and outer faces, said fastener comprising an elongated frame secured along each meeting edge and provided with an inner flange and with an outer flange, the latter flange sloping away from a median line located between said meeting edges, and a seam bar positioned between the meeting edges and having opposed recesses shaped to receive said inner flanges in interlocked relation while permitting one door to be opened independently of the other with the seam bar remaining attached to the latter door, locking plates hinged on the seam bar adjacent the outer surface of the doors and extending in opposite directions and engaging the outer face of each frame and provided with a rib on its inner surface sloping toward said median line, the outer face of said rib having a contour to interlock with the inner face of said outer flange of the frame.

2. The structure recited in claim 1 wherein the inner flange of each frame slopes towards said median line.

3. The structure recited in claim 1 wherein the seam bar is provided with an outer flange on each side of said median line which engages the outer sloping face of the outer flange of the frame.

4. The structure recited in claim 1 wherein the inner face of the outer flange and the outer face of the rib constitute arcs of a circle whose center is the axis of the locking plate.

5. The structure recited in claim 1 wherein each locking plate is secured in closed position by a plurality of quick-acting fasteners.

6. The structure recited in claim 1 wherein the inner end of the seam bar is formed with a cross head overlying the inner edges of the frames.

7. A quickly releasable structural seam fastener for providing a continuous interlock over the entire lengths of the meeting edges of a pair of outwardly opening doors provided with inner and outer faces, said fastener comprising an elongated frame secured along each meeting edge and provided with an inner flange sloping toward a median line located between said meeting edges and an outer flange sloping away from said median line and having inner and outer surfaces and a seam bar positioned between the meeting edges and provided with a cross head engaging both frames and having opposed recesses shaped to receive said inner flanges in interlocked relation while permitting one door to be opened independently of the other with the seam bar remaining attached to the latter door, locking plate hinged on each side of the seam bar adjacent the outer surface of the doors and extending in opposite directions and engaging the outer faces of each frame and provided with a rib on its inner surface sloping toward said median line, the outer face of said rib having a contour to interlock with the inner face of said outer flange of the frame, said latter faces forming arcs of a circle whose center is the axis of the locking plate.

8. A quickly releasable structural seam fastener for securing the meeting edges of a pair of doors or the like and to permit independent opening of each door and comprising a frame carried in fixed relation along the respective meeting edges of the doors and formed with inner and outer curved surfaces, and a seam bar provided with complemental curved surfaces for receiving the curved frame surfaces, and hinge plates carried by the seam bar for securing the door frame to said seam bar, each hinge plate being formed with a rib having convex and concave surfaces which are complemental to the curved surfaces of the frame when the parts are in interlocking engagement.

9. A quickly releasable structural seam fastener for securing the meeting edges of a pair of doors or the like and comprising a frame carried in fixed relation along the respective meeting edges of the doors and formed with inner and outer curved surfaces, and a seam bar positioned between said frames when the parts are in interlocked engagement and provided with complemental curved surfaces for receiving the curved frame surfaces and shaped to permit the opening of each door independently of the other, and hinge plates carried by the seam bar for securing the door frames to said concave surfaces which complement curved surfaces of the frame in interlocking engagement, and means for securing the hinge plates in locked relation.

References Cited in the file of this patent

UNITED STATES PATENTS

| | | |
|---|---|---|
| 2,465,452 | Helling | Mar. 29, 1949 |
| 2,879,959 | Morrison et al. | Mar. 31, 1959 |
| 2,896,751 | Henrichs | July 28, 1959 |